(12) United States Patent
Zagorski et al.

(10) Patent No.: US 10,962,164 B2
(45) Date of Patent: *Mar. 30, 2021

(54) PIPE ANCHOR

(71) Applicant: Rilco Manufacturing Company, Inc., Houston, TX (US)

(72) Inventors: Kenneth L. Zagorski, Houston, TX (US); Joseph A. Donoghue, Houston, TX (US); Michael E. Bock, Houston, TX (US)

(73) Assignee: Rilco Manufacturing Company, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,138

(22) Filed: Apr. 5, 2019

(65) Prior Publication Data

US 2019/0234552 A1    Aug. 1, 2019

Related U.S. Application Data

(63) Continuation of application No. 14/739,902, filed on Jun. 15, 2015, now Pat. No. 10,288,209, which is a
(Continued)

(51) Int. Cl.
*F16L 59/135* (2006.01)
*F16L 3/10* (2006.01)
(Continued)

(52) U.S. Cl.
CPC .......... *F16L 59/135* (2013.01); *F16L 3/1091* (2013.01); *F16L 59/024* (2013.01); *F16L 59/123* (2013.01)

(58) Field of Classification Search
CPC ....... F16L 59/021; F16L 59/024; F16L 59/12; F16L 59/123; F16L 59/135; F16L 59/14;
(Continued)

(56) References Cited

U.S. PATENT DOCUMENTS

| | | | | |
|---|---|---|---|---|
| 1,681,731 A | * | 8/1928 | Gottwald | F16L 3/18 |
| | | | | 138/106 |
| 1,888,241 A | * | 11/1932 | Rah | H02G 15/113 |
| | | | | 285/50 |

(Continued)

FOREIGN PATENT DOCUMENTS

JP     62177390     8/1987

*Primary Examiner* — Jonathan Liu
*Assistant Examiner* — Guang H Guan
(74) *Attorney, Agent, or Firm* — The Petruzzi Law Firm; James D. Petruzzi

(57) ABSTRACT

A pipe anchor is disclosed having a pipe trunnion stop for attaching to an outer surface of a pipe by welding. A mating top cradle and a bottom cradle generally encircle and hold a length of the pipe. The bottom cradle has a pass-through to accommodate the pipe trunnion stop. There is a base onto which the bottom cradle sets, the base includes a void into which the pipe trunnion stop is secured. An insulation layer is positioned between the pipe and the top cradle and bottom cradle, and around the pipe trunnion stop. A bolting assembly on the top cradle and a mating bolting assembly on the bottom cradle secure the top cradle and the bottom cradle to each other. Another embodiment includes multiple pipe trunnion stops along with respective pass-through and base void sections.

5 Claims, 2 Drawing Sheets

Related U.S. Application Data continuation of application No. 13/219,206, filed on Aug. 26, 2011, now Pat. No. 9,068,685.

(51) Int. Cl.
*F16L 59/02* (2006.01)
*F16L 59/12* (2006.01)

(58) Field of Classification Search
CPC ..... F16L 59/143; F16L 3/1008; F16L 3/1075; F16L 3/1091
USPC ............ 248/49, 55, 65, 72, 74.1, 74.4, 67.5; 285/47, 53, 61, 419; 138/108, 113, 106, 138/112, 149
See application file for complete search history.

(56) References Cited

U.S. PATENT DOCUMENTS

| | | | | |
|---|---|---|---|---|
| 2,690,193 A * | 9/1954 | Smith | .................... | F16L 55/172 138/99 |
| 3,315,927 A * | 4/1967 | Malloy | ..................... | F16L 3/16 248/55 |
| 4,403,759 A * | 9/1983 | Hicks | ....................... | F16L 3/18 248/55 |
| 4,530,478 A * | 7/1985 | McClellan | ............ | F16L 59/135 138/106 |
| 4,534,535 A * | 8/1985 | Maeda | .................. | F16L 55/035 248/49 |
| 5,078,346 A * | 1/1992 | Deichman | ............. | F16L 59/135 248/351 |
| 5,192,039 A * | 3/1993 | Williams | ............... | F16L 59/135 138/107 |
| 5,381,833 A * | 1/1995 | Cummings | ........... | F16L 59/135 138/107 |
| 5,749,548 A * | 5/1998 | Tamura | ..................... | F16L 3/18 248/176.2 |
| 5,924,656 A * | 7/1999 | Okada | ................... | F16L 59/135 138/106 |
| 7,213,790 B2 * | 5/2007 | Bailey | .................... | F16L 3/1016 248/65 |
| 7,472,870 B2 * | 1/2009 | Zagorski | ................... | F16L 1/06 138/108 |
| 7,950,609 B2 * | 5/2011 | Pothanikat | ............ | F16L 59/135 248/55 |
| 9,068,685 B2 * | 6/2015 | Bock | ...................... | F16L 3/1091 |
| 9,217,530 B2 * | 12/2015 | Minich | ..................... | F16L 41/06 |
| 10,190,714 B2 * | 1/2019 | Minich | ..................... | F16L 41/06 |
| 10,288,209 B2 * | 5/2019 | Zagorski | ............... | F16L 3/1091 |
| 2008/0272248 A1 * | 11/2008 | Pothanikat | ............ | F16L 55/035 248/55 |
| 2010/0180509 A1 * | 7/2010 | Pridemore | .............. | E04F 19/08 49/465 |
| 2013/0015317 A1 * | 1/2013 | Huang | ................... | G11B 33/08 248/636 |
| 2013/0022783 A1 * | 1/2013 | Zagorski | ................... | B32B 3/08 428/134 |

\* cited by examiner

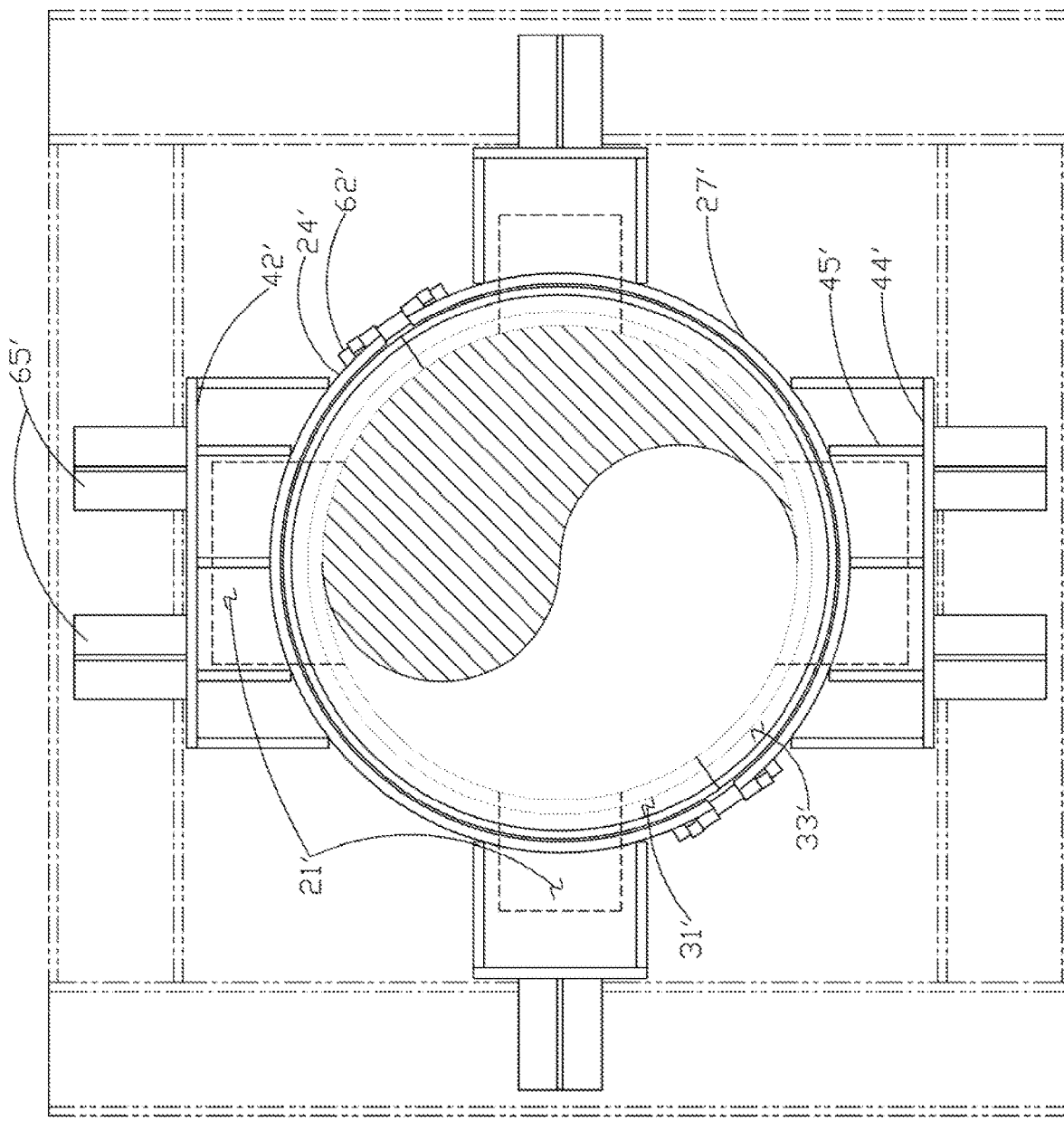

PIPE ANCHOR

RELATED APPLICATION DATA—CLAIM TO PRIORITY

This is a continuation of application Ser. No. 14/739,902 filed Jun. 15, 2015, entitled "Pipe Anchor", now issued as U.S. Pat. No. 10,288,209 which is a continuation of application Ser. No. 13/219,206 filed Aug. 26, 2011, entitled "Pipe Anchor" now issued as U.S. Pat. No. 9,068,685.

FIELD OF THE INVENTION

This Invention relates to insulated pipes. In particular this invention relates to insulated pipe anchors or restraints for insulated pipes.

BACKGROUND OF THE INVENTION

Typical pipe anchor supports use lugs or plates attached to the pipe. These lugs encircle the pipe and transmit the forces generated by the pipe movement from the pipe lugs, through the insulation, and to an opposing lug welded to a housing. There is serious design shortcoming when using this arrangement. In such environments, the insulation cross section width has to be great enough to allow sufficient compressive area to resist the compressive axial forces generated by the pipe and the stresses under which the pipe is held. Newer insulation materials allow for a thinner insulation cross section due to improved insulating qualities, thus greatly decreasing the area of compression to the point that typically pipe lugs will not function properly.

SUMMARY OF THE INVENTION

An advantage of the present invention is to provide a clamp-on anchor that can be assembled to a pipeline in the field that positively limits the movement of the pipe section relative to the housing assembly axially, laterally, and rotationally.

In accordance with the present invention, an improved pipe trunnion stop anchor provides a unique axial restraining system. A pipe trunnion stop is welded to a process pipe to transmit the axial force generated by the pipe to a base cradle. The base cradle includes structural, thermal inserts, which isolate the pipe trunnion stop from the base assembly. The assembly also retains the pipe trunnion stop from moving axially relative to the base assembly and retains the pipe trunnion stop from moving laterally relative to the base assembly. There is also a vertical support for the pipe trunnion stop.

In accordance with a preferred embodiment of the invention, there is shown a pipe anchor assembly having a pipe trunnion stop having sides and bottom for attaching to an outer surface of a pipe, mating top cradle and bottom cradle portions to generally encircle and hold a length of the pipe, a pass-though in the bottom cradle to allow the pipe trunnion stop to pass through, a base onto which the bottom cradle sets, and the base includes a void into which the pipe trunnion stop is secured.

In accordance with a preferred embodiment of the invention, there is shown a pipe anchor assembly having a pipe trunnion stop having sides and bottom, and a generally polygonal cross-sectional shape, for attaching to an outer surface of a pipe, a mating top cradle and bottom cradle portions to generally encircle and hold a length of the pipe, a pass-though in the bottom cradle to allow the pipe trunnion stop to pass through, a base onto which bottom cradle sets, the base includes a void into which the pipe trunnion is secured, an insulation layer positioned between the pipe and bottom cradle portion, an insulation layer positioned all sides and bottom of the pipe trunnion stop; and a base support having at least two stops.

In accordance with a preferred embodiment of the invention, there is shown a pipe anchor assembly having a pipe trunnion stop having sides and bottom for attaching to an outer surface of the pipe, at least one strap to generally encircle and hold a length of the pipe, a base onto which strap sets, the base includes a void into which the pipe trunnion is secured, and an insulation void positioned around the trunnion stop in the base void.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 2 is a head on view of the pipe anchor assembly in accordance with another preferred embodiment of the present invention.

DETAILED DESCRIPTION OF THE PREFERRED EMBODIMENTS

Figure 1:
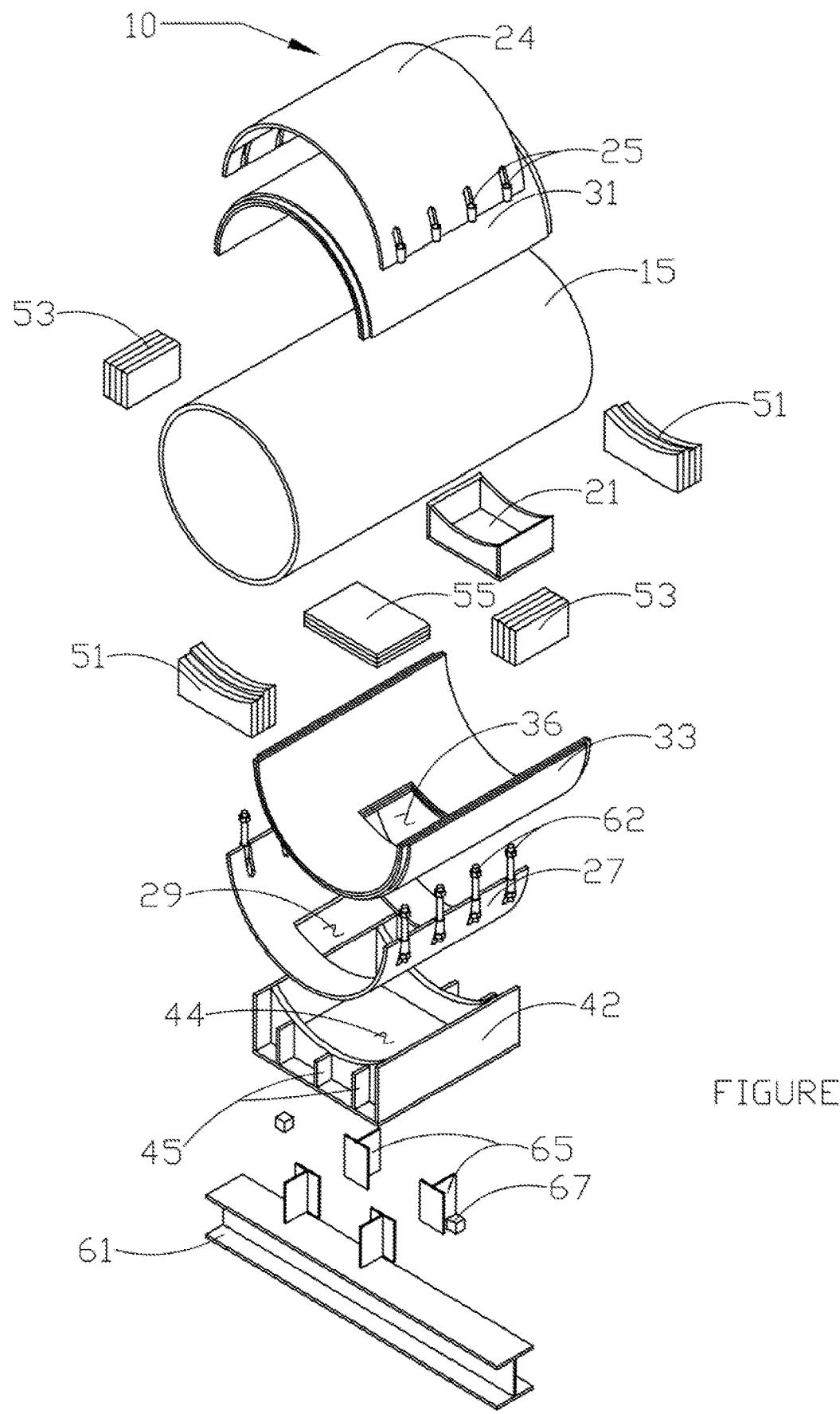
FIG. 1 shows an exploded view of the pipe anchor assembly in accordance with a preferred embodiment of the present invention.

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Turning first to FIG. 1, there is shown a pipe anchor in accordance with the preferred embodiment of the present invention. Pipe anchor 10 is shown in the exploded view encircling a cross-sectional length of pipe 15. Pipe anchor 10 captures pipe 15 in two ways. First, pipe anchor 10 clamps to pipe 15, encircling it completely and is secured by bolting assemblies 62, described in more detail below. Simultaneously, pipe trunnion stop 21 engages with cavity 44 in the base assembly 42, also described in more detail below.

Pipe trunnion stop 21 is welded to pipe 15 in the preferred, illustrated embodiment, though other ways of securing pipe trunnion stop 21 to pipe 15 may be used, including intermediate tabs and bolts, brazing, and integrally fabricating the stop on the pipe section. The cross-sectional shape of pipe trunnion stop 21 is shown as rectangular, but it will be appreciated that the shape may be of a variety of shapes, depending upon the particular environment in which the pipe anchor assembly is intended to be used. The pipe trunnion stop 21 in conjunction with the opposing cavity 44 in base assembly 42 offers improved anchoring. Preferably, it will be shaped in a polygonal configuration to prevent slippage or movement within the cavity. In some embodiments, it may also be circular, oval or elliptical. The base assembly 42 length and width along with pipe trunnion stop 21 length and width can be modified as required to develop sufficient area to oppose the forces generated by movement from forces to the pipe 15.

Pipe anchor 10 includes top cradle 24 and base cradle 27. Top cradle 24 includes bolting tubes 25 that mate with bolting tubes 62 on base cradle 27. By these mating bolting tubes 25, 62, pipe anchor 10 encircles pipe 15. Base cradle 27 also includes pass-though void 29 so that pipe trunnion stop 21 may pass through and be secured in base assembly 42 as illustrated. In the illustrated embodiment, there are shown eight bolting tubes 25 on top cradle 24, and eight mating bolting tubes 62 on base cradle 27, though it will be appreciated that any appropriate number of bolting tubes may be employed, depending upon the environment. Alternatively, mating top cradle 24 and base cradle 27 may be hingedly attached on one side and appropriately affixed to each other on the other side with bolts or other mechanisms known in the art.

To provide required insulation to the pipe 15 in the area of pipe anchor 10, top thermal insulation 31 is provided and located between pipe 15 and top cradle 24. Similarly, lower thermal insulation 33 is located between pipe 15 and base cradle 27. Also provided in lower thermal insulation 33 is pass-though void 36 to allow pipe trunnion stop 21 to pass through lower thermal insulation 33 and mate securely with base assembly 42 as illustrated. As can be readily appreciated, the preferred design includes a void or space for insertion of insulation about the trunnion and other areas where thermal loss may be present. Alternatively, pipe 15 may be secured to top thermal insulation 31 and lower thermal insulation 33 by encircling straps, ties, or other circumferential brackets which allow for passage of the pipe trunnion stop 21. Also, cradles may be configured to encircle pipe 15 and then bracketed or strapped to encircle pipe 15 and permit use of insulation.

Due to pipe trunnion stop 21 being attached to pipe 15, further insulation is desired. Accordingly, axial stop structural insulation 51 is shown forward and aft of the forward and rearward side walls of pipe trunnion stop 21, to insulate around pipe trunnion stop 21 and aide in axial stability of pipe 15. Similarly, lateral stop structural insulation 53 is shown adjacent lateral side walls of pipe trunnion stop 21, to provide insulation and aide in lateral stability of pipe 15. To complete insulation around pipe trunnion stop 21, there is provided vertical stop structural insulation 55, and aides in vertical stability of pipe trunnion stop 21. Axial stop insulation 51, lateral stop structural insulation 53, and vertical stop structural insulation 55 are shown in FIG. 1 as separated by some distance from pipe trunnion stop 21, but it is only for illustrative purposes, and in use, are immediately adjacent the respective walls of pipe trunnion stop 21.

Continuing in FIG. 1, there is shown base assembly 42 on which pipe 15, along with pipe anchor 10, are supported. Base assembly 42 is curved to support and provide stability for pipe 15 and base cradle 27. Base assembly 42 further includes cavity 44 into which pipe trunnion stop 21 along with axial stop insulation 51, lateral stop structural insulation 53, and vertical stop structural insulation 55 fit. Support fins 45 are also illustrated on base assembly 42 to provide additional structural support, and it will be understood that any number and design of support fins may be employed for a particular purpose. Base assembly 42 fits onto base assembly support 61 as shown in FIG. 1 and includes external axial stops 65 and external lateral stops 67 to provide additional axial and lateral support to deter movement of pipe 15. In the field, base assembly support 61 is often pre-existing and base assembly 42 is attached to base assembly support 61 by, in the illustrated embodiment, welding.

As illustrated in the preferred embodiment, pipe trunnion stop 21 provides improved lateral, axial and vertical support while maintaining insulation for pipe 15. It will be appreciated that in the particular insulation used is not part of the inventions, and any appropriate insulation material may be used. In the preferred embodiment shown, a thin insulation based on aerogel may be employed including insulation sold under the trademark Cryogel®.

Turning next to FIG. 2, there is shown a front view of a pipe anchor in accordance with another preferred embodiment of the present invention. Similar elements of FIG. 1, described above, are labeled with similar number labels for consistency, though with a prime after the number label. Accordingly, in FIG. 2 there is shown top cradle 24', base cradle 27', top thermal insulation 31', lower thermal insulation 33', base assembly 42', support fins 45', and axial stops 65'. The embodiment of FIG. 2 shows four pipe trunnion stops 21' positioned around the circumference of the pipe at approximately 0°, 90°, 180°, and 270°. It will be appreciated by those in the art that any one, two, three or all four pipe trunnion stops 21' may be used and can be positioned at any location about the pipe circumference, as is appropriate for the particular environment and use desired. To accommodate four pipe trunnion stops 21', bolt assembly 62' is offset at approximately 45° for the horizontal, though any appropriate positioning may be employed. Depending upon the number and location of pipe trunnion stops 21', the number and location of cradle pass-though voids, as well as insulation pass-through voids and base assemblies and respective voids 44' will also be adjusted. As noted above, encircling metal brackets, straps or straps to affix circumferential metal casing may be employed without departing from the spirit and scope of the invention.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

We claim:

1. A pipe anchor assembly comprising:
a pipe fixedly attached to a trunnion stop, the trunnion stop comprising an extended cylinder having a cross sectional shape and a bottom surface, the cross sectional shape of the extended cylinder being an oval shape, an elliptical shape, or a circular shape and the extended cylinder further having an upper arcuate edge, wherein the pipe is fixedly attached to the upper arcuate edge of the extended cylinder;
a pipe anchor encircling a partial length of the pipe, the pipe anchor including a top cradle, a bottom cradle, and a bolted securing assembly the bolted securing assembly having a first securing element and a second securing element, the first securing element being disposed on the top cradle, the second securing element being disposed on the bottom cradle, the first and second securing elements being coupled to each other to secure the top cradle to the bottom cradle when the pipe anchor encircles the partial length of the pipe;
an insulation layer positioned between the pipe and the pipe anchor;

a pass-through in the insulation layer and having a cross sectional shape matching the cross sectional shape of the extended cylinder of the trunnion stop to accommodate the trunnion stop;

a pass-through in the bottom cradle to accommodate the trunnion stop;

a plurality of structural insulation pieces, each of the plurality of structural insulation pieces being positioned immediately adjacent an outer periphery of the extended cylinder or the bottom surface of the extended cylinder; and a base, wherein the bottom cradle is positioned on the base, the base includes a side wall, a bottom portion, and a mating void, the mating void is formed by the side wall and the bottom portion, the mating void has a shape substantially similar to the cross sectional shape of the extended cylinder of the trunnion stop, and the trunnion stop and the plurality of structural insulation pieces fit into the mating void for stable engagement of the pipe to the base.

2. A pipe anchor assembly as claimed in claim 1, wherein the pipe is welded to the trunnion stop.

3. A pipe anchor assembly as claimed in claim 1, wherein the base includes at least one axial stop.

4. A pipe anchor assembly as claimed in claim 1, wherein the insulation layer and the plurality of structural insulation pieces comprise aerogel.

5. A pipe anchor assembly as claimed in claim 1, wherein the plurality of structural insulation pieces comprise a first piece around the outer periphery of the extended cylinder and a second piece on the bottom surface of the trunnion stop.

\* \* \* \* \*